(12) United States Patent
Kraft

(10) Patent No.: US 7,100,377 B2
(45) Date of Patent: Sep. 5, 2006

(54) METHODS FOR OPERATING GAS TURBINE ENGINES

(75) Inventor: Robert Eugene Kraft, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/312,058

(22) Filed: Dec. 20, 2005

(65) Prior Publication Data

US 2006/0096295 A1     May 11, 2006

Related U.S. Application Data

(62) Division of application No. 10/929,910, filed on Aug. 30, 2004, now Pat. No. 7,007,455.

(51) Int. Cl.
*F02C 5/00*     (2006.01)

(52) U.S. Cl. .................................................. 60/776

(58) Field of Classification Search ............... 60/39.38, 60/39.39, 39.76, 39.77, 39.78, 247, 776; 431/1
See application file for complete search history.

(56) References Cited

U.S. PATENT DOCUMENTS

| 5,901,550 A * | 5/1999 | Bussing et al. ............ 60/39.38 |
| 6,439,503 B1 * | 8/2002 | Winfree et al. ............... 60/247 |
| 6,442,930 B1 * | 9/2002 | Johnson et al. ............... 60/247 |

* cited by examiner

*Primary Examiner*—Louis J. Casaregola
(74) *Attorney, Agent, or Firm*—William Scott Andes; Armstrong Teasdale LLP

(57) ABSTRACT

A method for operating a pulse detonation system. The method includes providing a pulse detonation chamber including a plurality of detonation tubes extending therein, and detonating a mixture of fuel and air within each detonation tube such that at least a first tube is detonated at a different time than at least a second detonation tube.

4 Claims, 3 Drawing Sheets

METHODS FOR OPERATING GAS TURBINE ENGINES

CROSS-REFERENCE TO RELATED APPLICATIONS

This application is a divisional of U.S. patent application Ser. No. 10/929,910, filed Aug. 30, 2004, now U.S. Pat. No. 7,007,455 which claims priority to U.S. Pat. No. 6,813,878, issued Nov. 9, 2004, both of which are hereby incorporated by reference and are assigned to assignee of the present invention.

BACKGROUND OF THE INVENTION

This invention relates generally to gas turbine engines and more particularly, to a pulse detonation system for a gas turbine engine.

At least some known pulse detonation systems use a series of repetitive detonations within a detonation chamber to produce a high pressure exhaust. More specifically, a fuel and air mixture is periodically detonated within a plurality of tubes within the detonation chamber to create hot combustion gases which cause pressure waves to propagate at supersonic speeds within the tubes and chamber. The pressure waves compress the hot combustion gases, which increases a pressure, density, and a temperature of the gases to produce thrust as the pressure waves pass the exit of an open end of the detonation chamber.

Gas turbine engines producing thrust using pulse detonation systems typically have a higher thrust to weight ratio because they are generally smaller and weigh less than conventional gas turbine engines. In addition, pulse detonation engines may include fewer rotating parts, produce lower emissions, and be more fuel efficient than conventional gas turbine engines. Pulse detonation engines also may not suffer stall and startup problems that may be experienced by some known gas turbine engines because of separation in and around compressor blades within the conventional engines.

However, pressures generated within the detonation chamber of some known pulse detonation systems may cause at least some known pulse detonation engines to be very loud and may facilitate structural failures within the engines. More specifically, each detonation tube has a firing frequency that is dependent upon the dynamics of detonation and a geometry of the tube. While conventional detonation chambers create thrust by imparting overall pressure rise the hot combustion gases, known pulse detonation tubes also have a dynamically varying positive pressure rise and fall in each tube as each tube repeatedly fires. The dynamic periodicity of such pressures may induce dynamic pressure loads to the pulse detonation system which may propagate from the system as acoustic pressure waves, i.e., noise.

BRIEF SUMMARY OF THE INVENTION

In one aspect, a method is provided for operating a pulse detonation system. The method includes providing a pulse detonation chamber including a plurality of detonation tubes extending therein, and detonating a mixture of fuel and air within each detonation tube such that at least a first tube is detonated at a different time than at least a second detonation tube.

In another aspect, a control system is provided for a pulse detonation system including a plurality of detonation tubes. The control system includes a processor that is programmed to control detonation of a mixture of fuel and air within each detonation tube, such that at least a first detonation tube is detonated at a time that is different from a time of detonation of at least a second detonation tube.

In yet another aspect, a pulse detonator is provided for a pulse detonation system. The chamber includes an inner casing, and an outer casing that is substantially coaxial with the inner casing, and is spaced radially outwardly from the inner casing. The inner and outer casings define a detonation chamber therebetween. A plurality of detonation tubes extend at least partially within the detonation chamber. At least a portion of at least a first detonation tube is stacked radially outwardly from at least a portion of at least an adjacent second detonation tube, such that a first central axis of the first detonation tube is spaced radially outwardly from a second central axis of the adjacent second detonation tube.

In even another aspect, a pulse detonation system is provided that includes a pulse detonator including a plurality of detonation tubes extending at least partially within the pulse detonator, and a control system that includes a processor programmed to control the detonation of a mixture of fuel and air within each detonation tube such that at least a first detonation tube is detonated at a time that is different from a time of detonation of at least a second detonation tube.

DETAILED DESCRIPTION OF THE INVENTION

The term computer, as used herein, means any microprocessor-based system including systems using microcontrollers, reduced instruction set circuits (RISC), application specific integrated circuits (ASICs), logic circuits, and any other circuit or processor capable of executing the functions described herein.

Figure 1:
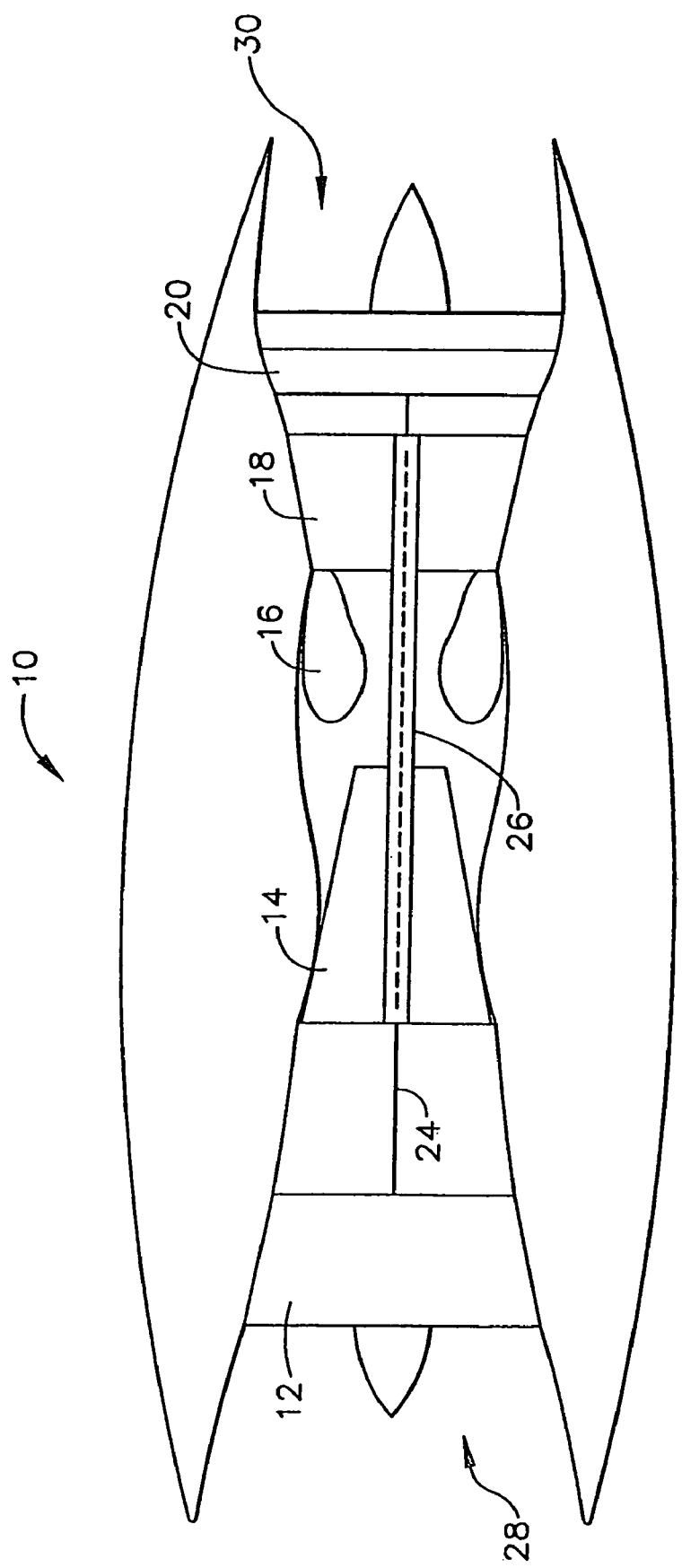
FIG. 1 is a schematic illustration of an exemplary gas turbine engine.

FIG. 1 is a schematic illustration of a gas turbine engine 10 including a low pressure compressor 12, a high pressure compressor 14, and a pulse detonation system 16. Engine 10 also includes a high pressure turbine 18, and a low pressure turbine 20. Compressor 12 and turbine 20 are coupled by a first shaft 24, and compressor 14 and turbine 18 are coupled by a second shaft 26. In one embodiment, engine 10 is a F110/129 engine available from General Electric Aircraft Engines, Cincinnati, Ohio.

In operation, air flows through low pressure compressor 12 from an inlet side 28 of engine 10 and compressed air is supplied from low pressure compressor 12 to high pressure compressor 14. Compressed air is then delivered to pulse detonation system 16 where it is mixed with fuel and ignited. The combustion gases are channeled from pulse detonation system 16 to drive turbines 18 and 20 and provide thrust from an outlet 30 of engine 10.

Figure 2:
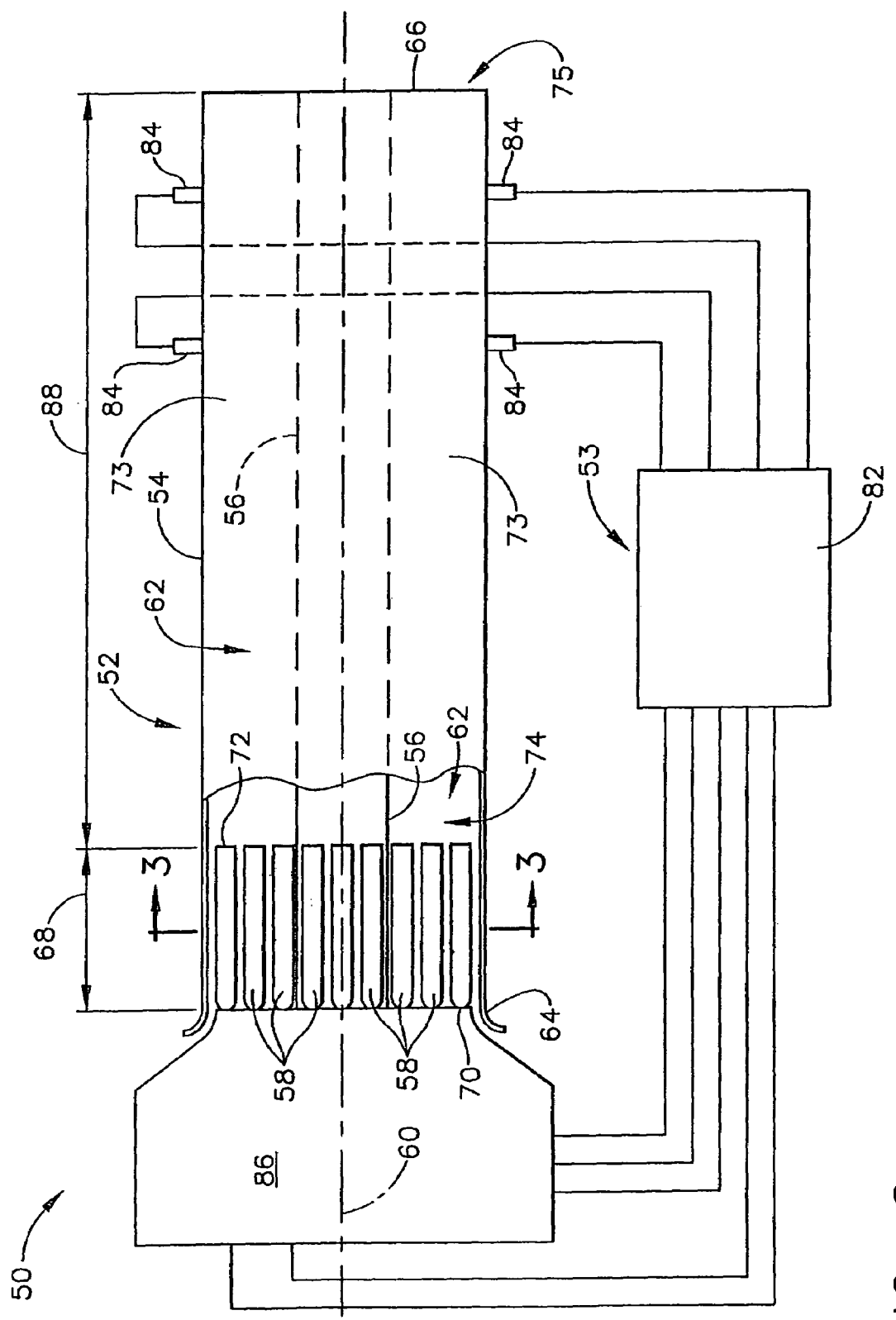
FIG. 2 is a schematic illustration of an exemplary pulse detonation system for use with the gas turbine engine shown in FIG. 1.
Figure 3:
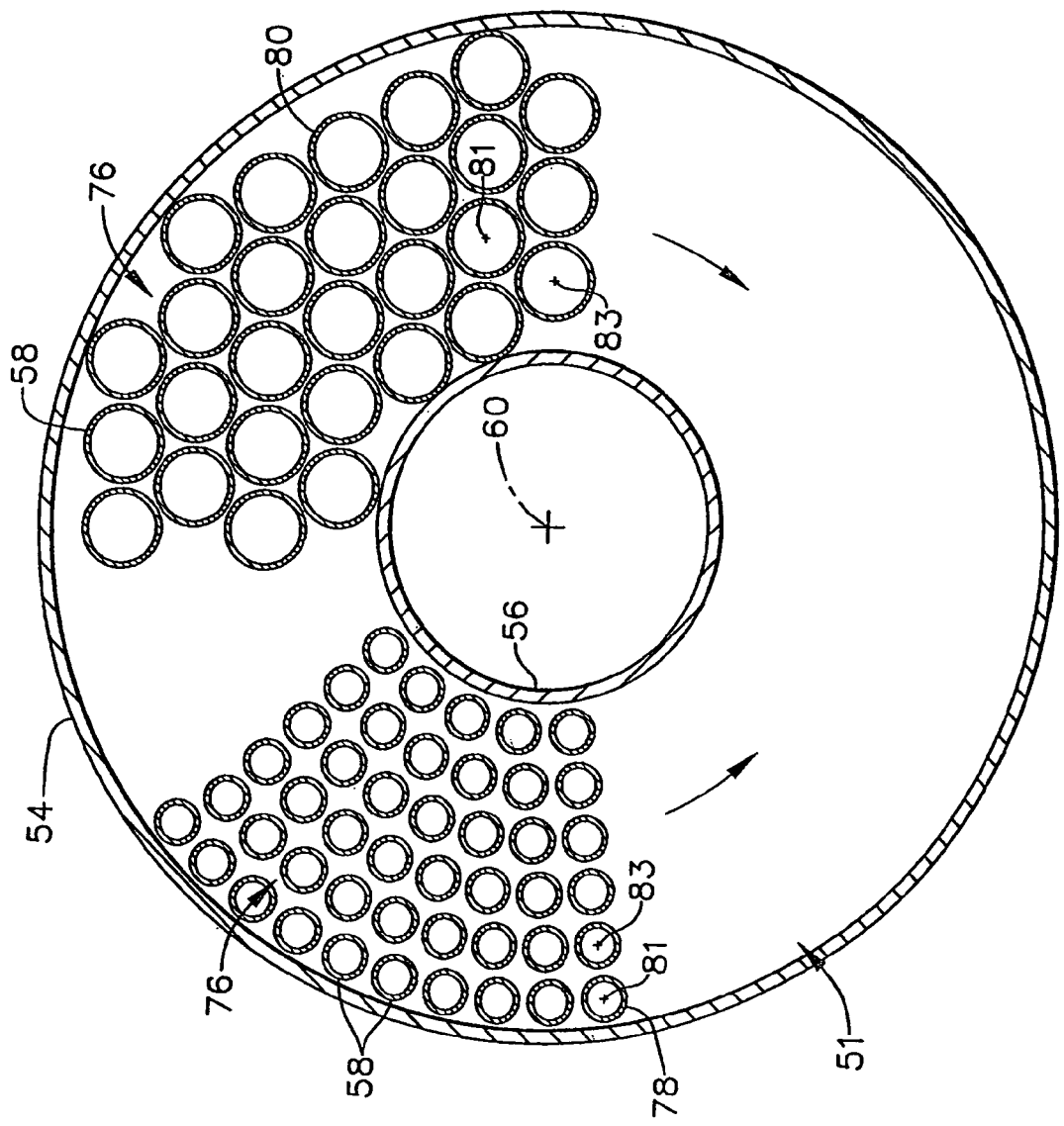
FIG. 3 is a cross-sectional view of a portion of a detonator shown in FIG. 2 and taken alone line 3—3.

FIG. 2 is a schematic illustration of an exemplary pulse detonation system 50 for use with a gas turbine engine, for example engine 10 (shown in FIG. 1). FIG. 3 is a cross-sectional view of a portion of a pulse detonator 52 for pulse detonation system 50 taken along line 3—3. Pulse detonation system 50 includes a pulse detonator 52 and a control system 53. Pulse detonator 52 includes annular outer and inner casings 54 and 56, respectively, and a plurality of detonation tubes 58. Outer and inner casings 54 and 56 are disposed substantially coaxially about a longitudinal centerline axis 60 of pulse detonation system 50 and are spaced radially apart such that a detonation chamber 62 is defined therebetween. Pulse detonator 52 includes an inlet end 64, an outlet end 66, and detonation tubes 58. Detonation tubes 58 extend through detonation chamber 62 along axis 60, and also extend a length 68 measured from an upstream end 70 that is adjacent chamber inlet side 64, to a downstream end 72. An exhaust chamber 73 is defined between detonation tube downstream ends 72 and detonator outlet end 66. Exhaust chamber 73 includes an upstream end 74 and a downstream end 75.

Detonation tubes 58 are stacked in an array 76 within detonation chamber 62 such that a plurality of tubes 58 are spaced circumferentially around axis 60, and such that a plurality of tubes 58, or a portion of a plurality of tubes 58, are stacked radially outwardly from inner casing 56 to outer casing 54. In an alternative embodiment, detonation tubes 58 are stacked within detonation chamber 62 such that a plurality of tubes 58 are spaced circumferentially around axis 60 and such that only one tube 58 is positioned radially between inner casing 56 and outer casing 54.

In the exemplary embodiment, detonation tubes 58 each have a substantially circular cross-sectional geometric shape, and tubes 58 substantially occupy the space defined between inner and outer casings 56 and 54, respectively. Furthermore, as illustrated in FIG. 3, tubes 58 are arranged in stacks 78 which include smaller diameter tubes 58, and stacks 80 which include larger diameter tubes 58. More specifically, in the exemplary embodiment, a central axis 81 of a first tube 58 is spaced radially outwardly from a central axis 83 of a second tube 58 that is adjacent the first tube 58. However, it will be understood that the number, geometric shape, configuration, and/or diameter of tubes 58 will vary depending upon the particular application, and as described below. For example, in one embodiment, detonation tubes 58 each have approximately equal diameters. In another embodiment, detonation tubes 58 include tubes of varying diameter. Furthermore, it will be understood that a length 68 of each tube 58 will vary depending upon the particular application, and as described below. For example, in one embodiment, detonation tubes 58 each include approximately equal lengths 68. In another embodiment, detonation tubes 58 include tubes of varying length 68. The examples herein described are intended as exemplary only, and are not intended to limit the number, geometric shape, configuration, diameter, and/or length 68 of detonation tubes 58.

Control system 53 includes a computer and/or processor 82, a plurality of pressure feedback sensors 84, and a firing system 86 that is coupled to detonation tubes 58 adjacent upstream ends 70. As described below, firing system 86 charges each tube 58 with compressed air and fuel, and periodically detonates the mixture of fuel and air within each tube 58 to produce hot combustion gases within each tube 58 and exhaust chamber 73. Sensors 84 are coupled to outer casing 54 adjacent exhaust chamber 73, and measure a pressure of combustion gases within exhaust chamber 73. Computer 82 is electrically coupled to sensors 84 and firing system 86. In one embodiment, computer 82 is a multiple-input, multiple-output, (MIMO) electronic control computer. In an alternative embodiment, control system 52 includes only one pressure feedback sensor 84.

Firing system 86 charges each detonation tube 58 with fuel, from a fuel source (not shown), and compressed air from compressors 12 and 14 (shown in FIG. 1). The mixture is detonated to produce hot combustion gases within each tube 58 that flow downstream through exhaust chamber 73 and are discharged from detonation chamber outlet end 66 towards turbines 18 and 20 (shown in FIG. 1) and engine outlet 30 (shown in FIG. 1). In one embodiment, compressed air and fuel are mixed by firing system 86 before the mixture is supplied to each detonation tube 58. In an alternative embodiment, compressed air and fuel are each independently supplied to each detonation tube 58 and are mixed within each detonation tube 58.

Firing system 86 does not continuously detonate the mixture within tubes 58. Rather, and as described below, firing system 86 periodically cycles the detonation of the fuel/air mixture to generate pressure waves, or pulses, that propagate through the combustion gases to facilitate increasing the pressure and temperature of the combustion gases to provide thrust. The pressure waves propagate downstream through tubes 58 and exhaust chamber 73.

The methods and systems described herein facilitate containing larger dynamic pressure variations within tubes 58 and exhaust chamber upstream end 74, such that dynamic pressure variations are reduced within exhaust chamber downstream end 75 as combustion gases exit engine exhaust 30. More specifically, firing system 86 detonates the fuel air mixture in each tube 58, referred to herein as filing each tube 58, sequentially such that only a desired number of tubes 58 are fired simultaneously. In one embodiment, each tube 58 is fired independently at a different time. In an alternative embodiment, a plurality of tubes 58 are fired simultaneously, and a plurality of tubes 58 are fired non-simultaneously.

As each individual tube 58 fires, a positive-going pressure pulse is emitted that propagates downstream through exhaust chamber 73 from upstream end 74 to downstream end 75. Sensors 84 sense the pressure pulses from various tubes 58 within exhaust chamber 73. Computer 82, using an active noise-control algorithm, determines an appropriate firing sequence for tubes 58, based on the sensed pressure pulses, such that dynamic pressure variations are reduced within exhaust chamber 73, while a high and steady pressure of combustion gases is exhausted through detonator outlet end 66 and ultimately, engine exhaust 30. More specifically, computer 82 controls firing of each tube 58 within array 76 such that low, positive pressure regions of pressure pulses are substantially aligned with high, positive pressure regions of adjacent pulses. Aligning adjacent pulses in such a manner facilitates reducing pressure variations. Specifically, as pressure pulses propagate through exhaust chamber 73, higher amplitude dynamic pressure variations are substantially smoothed out, causing the exhaust of combustion gases exiting exhaust chamber 73 and engine exhaust 30 to be at a substantially uniform and high pressure. Accordingly, high amplitude dynamic pressure variations are substantially contained within tubes 58 and exhaust chamber upstream end 74, such that a reduction in dynamic pressure loads is induced within system 50, and the number and intensity of acoustic pressure waves emitted by system 50 are facilitated to be reduced. As a result, structural failures associated with system 50 and a level of noise emitted by system 50 are facilitated to be reduced.

In one embodiment, each tube 58 within array 76 is fired such that high positive pressure regions of pressure pulses align with high positive regions of adjacent pressure pulses to facilitate increasing the positive pressure of the pressure pulses, and thereby increasing the pressure of the hot combustion gases exhaust from exhaust chamber 73.

An exhaust chamber length 88, measured between the downstream end 72 of the longest tube 58 within array 76 and detonator outlet end 66, is variably selected to facilitate reducing dynamic pressures to a pre-determined level. More specifically, the geometry and configuration of detonation tubes 58 is also variably selected. For, example, in one embodiment, a greater number of smaller diameter tubes 58 may facilitate a shorter exhaust chamber length 88, than a smaller number of larger diameter tubes 58.

The above-described pulse detonation system facilitates reducing structural failures of the system and noise produced by the system. More specifically, by aligning low positive pressure regions with high positive pressure regions of adjacent pulses, the system facilitates reducing dynamic pressure loads within the system and facilitates reducing the number and intensity of acoustic pressure waves emitted by the system. In addition, the above-described pulse detonation system may facilitate increasing the thrust of a pulse detonation engine by aligning high positive pressure regions with high positive regions of adjacent pressure pulses. As a result, a pulse detonation system is provided which may facilitate an engine that has a longer engine life, and operates with increased thrust, increased efficiency, and reduced noise.

Exemplary embodiments of pulse detonation systems are described above in detail. The systems are not limited to the specific embodiments described herein, but rather, components of each system may be utilized independently and separately from other components described herein. Each pulse detonation system component can also be used in combination with other pulse detonation system components.

While the invention has been described in terms of various specific embodiments, those skilled in the art will recognize that the invention can be practiced with modification within the spirit and scope of the claims.

What is claimed is:

1. A method for operating a pulse detonation system, said method comprising:

providing a pulse detonation chamber including a plurality of detonation tubes extending therein, wherein at least one detonation tube has a length that is unequal to a length of at least one other detonation tube; and detonating a mixture of fuel and air within each detonation tube such that at least a first detonation tube is detonated at a different time than at least a second detonation tube.

2. A method in accordance with claim 1 wherein detonating a mixture of fuel and air within each detonation tube comprises detonating at least two detonation tubes such that a region of a first pressure wave generated is substantially aligned with a region of a second pressure wave generated.

3. A method in accordance with claim 1 wherein providing a pulse detonation chamber comprises providing a pulse detonation chamber including at least one detonation tube that has a diameter that is unequal to a diameter of at least one other detonation tube.

4. A method in accordance with claim 1 wherein providing a pulse detonation chamber comprises:

providing a pulse detonator including an inner casing, and an outer casing that is substantially coaxial with the inner casing and is spaced radially outwardly from the inner casing such that a pulse detonation chamber is defined between the inner and outer casings; and stacking at least a portion of at least one first detonation tube radially outwardly from at least a portion of at least one adjacent detonation tube within the detonation chamber such that a first central axis of the first detonation tube is spaced radially outwardly from a second central axis of the adjacent detonation tube.

* * * * *